United States Patent
Gallagher et al.

(10) Patent No.: US 7,369,500 B1
(45) Date of Patent: May 6, 2008

(54) DYNAMIC QUEUE THRESHOLD EXTENSIONS TO RANDOM EARLY DETECTION

(75) Inventors: Shawn Gallagher, Chelmsford, MA (US); Stephen Branam, Leominster, MA (US); Thomas A. Lemaire, Acton, MA (US); Michael E. Lipman, Harvard, MA (US); Ryan Ross, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 959 days.

(21) Appl. No.: 10/608,215

(22) Filed: Jun. 30, 2003

(51) Int. Cl.
*H04L 12/26* (2006.01)
*G06F 15/16* (2006.01)

(52) U.S. Cl. .................. 370/235; 370/412; 709/235

(58) Field of Classification Search ........ 370/229–234, 370/235–238, 412–418; 709/223–225, 232, 709/235
See application file for complete search history.

(56) References Cited

U.S. PATENT DOCUMENTS 6,252,848 B1 * 6/2001 Skirmont .................. 370/229
6,675,220 B1 * 1/2004 Bergamasco et al. ....... 709/232
6,721,796 B1 * 4/2004 Wong ......................... 709/232
6,961,307 B1 * 11/2005 Aweya et al. ............... 370/230
6,980,516 B1 * 12/2005 Wibowo et al. ............ 370/235

OTHER PUBLICATIONS

Lin et al., Dynamic of Random Early Detection, SIGCOMM' 97, ACM 0-89791-905, pp. 127-137.*
Wang et al., Refined Design of Random Early Detection Gateways, University of Michigan, 1999, pp. 1-7.*
Ott et al., SRED: Stabilized RED, Proceedings of IEEE INFOCOM '99, New York, vol. 3, Mar. 21-25, 1999, pp. 1346-1355.*
"Random Early Detection Gateways for Congestion Avoidance," Sally Floyd and Van Jacobson, IEEE/ACM Transactions on Networking, pp. 1-32, Aug. 1993.
IETF RFC 2309: "Recommendations on Queue Management and Congestion Avoidance on the Internet," pp. 1-16, 1998.

* cited by examiner

*Primary Examiner*—Chi Pham
*Assistant Examiner*—Tri H. Phan
(74) *Attorney, Agent, or Firm*—Harrity Snyder, LLP

(57) ABSTRACT

A buffer memory may be configured to temporarily store data in a number of queues. A processor may be configured to measure a fullness of the buffer memory. The processor may also be configured to assign sizes to the number of queues based on the fullness of the buffer memory. The processor may also adjust thresholds of drop profiles associated with the number of queues based on the sizes assigned to the number of queues.

22 Claims, 7 Drawing Sheets

DYNAMIC QUEUE THRESHOLD EXTENSIONS TO RANDOM EARLY DETECTION

BACKGROUND OF THE INVENTION

1. Field of the Invention

The present invention relates generally to data communication and, more particularly, to systems and methods for performing random early detection (RED) in a data forwarding sub-system.

2. Description of Related Art

Network devices, such as routers, relay streams of data through a network from a source to a destination. Typically, the network devices include one or more memory sub-systems to temporarily buffer data before transferring the data from the device. A network device may assign a number of queues (e.g., where a queue may be considered a logical first-in, first-out (FIFO) buffer) with which to buffer the data. In some instances, queues may be associated with characteristics of the data, such as destination interfaces (e.g., ports) of the data and/or a "class" of the data or some other combination of characteristics.

In some situations, data may build up too quickly in the queues (i.e., data is enqueued at a faster rate than it is dequeued), thereby causing congestion. To avoid forced "tail dropping" (i.e., dropping a chunk (e.g., a packet) of data from the tail of a queue, or before it is added to the queue), network devices may proactively employ RED to randomly drop chunks of data and ease congestion in the queues. RED schemes typically involve fixed-size queues in which fixed threshold values determine when chunks of data are randomly dropped and with what probabilities.

Some network devices, however, may dynamically adjust queue sizes in accordance with current usage conditions. Such dynamic adjustment of queue size may, for example, enforce fairness when resources are scarce within the network device and promote sharing when resources are plentiful. Each one of dynamic adjustment of queue size and RED is challenging to implement alone, and such difficulties would be multiplied if RED were desired in a changing queue environment. Different classes (e.g., service levels) of data only add to these problems.

As a result, there is a need for systems and methods for implementing RED in an environment where queue sizes/lengths dynamically change.

SUMMARY OF THE INVENTION

Systems and method consistent with the principles of the invention address this and other needs by providing congestion control techniques to efficiently process and buffer data in a network device. Data dropping schemes may be retained even when queue lengths change due to dynamic oversubscription.

In accordance with the principles of the invention as embodied and broadly described herein, a system for providing congestion control may include a buffer memory configured to temporarily store data in a number of queues. A processor may be configured to measure a total amount of memory occupied by the number of queues in the buffer memory. The processor may modify lengths of the number of queues based on the total amount of memory occupied. The processor may also modify drop profiles associated with the number of queues based on the total amount of memory occupied.

In another implementation consistent with the principles of the invention, a device may include a buffer memory configured to temporarily store data in a number of queues. The network device may also include a processor configured to measure a fullness of the buffer memory. The processor may also be configured to assign sizes to the number of queues based on the fullness of the buffer memory. The processor may also adjust thresholds of drop profiles associated with the number of queues based on the sizes assigned to the number of queues.

In a further implementation consistent with the principles of the invention, a method for providing congestion control for data stored in queues may include periodically measuring a fullness of a memory that contains the queues. The method may include decreasing sizes of the queues when the fullness of the memory increases and increasing sizes of the queues when the fullness of the memory decreases. The method may also include adjusting queue fullness thresholds based on the sizes of the queues. The queue fullness thresholds for a particular queue may define a queue fullness region inside which the data in the particular queue is randomly dropped.

In yet another implementation consistent with the principles of the invention, a method for providing congestion control for data stored in queues may include dynamically changing oversubscription of the queues based on total usage of a memory that contains the queues. Changing such oversubscription may set new lengths for the queues. Random early detection may be performed on the queues based on the new lengths.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents of the recited claim limitations.

Systems and methods consistent with the principles of the invention may efficiently drop packets when queue sizes dynamically change by using percentages of the queue sizes as drop thresholds. The systems and methods provide congestion control techniques to efficiently process and buffer chunks of data.

Exemplary Network Device Configuration

Figure 1:
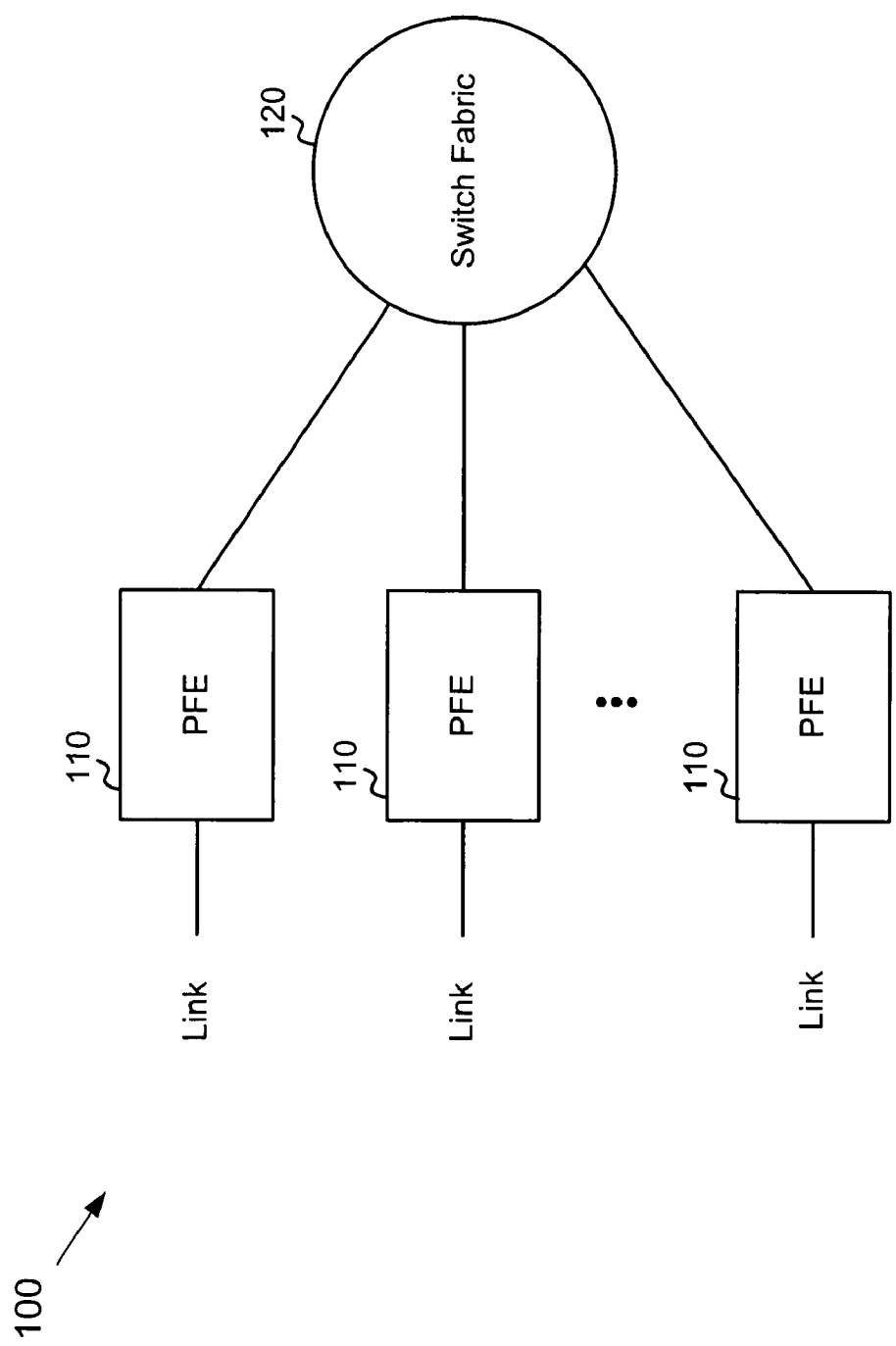
FIG. 1 is a diagram of an exemplary network device in which systems and methods consistent with the principles of the invention may be implemented.

FIG. 1 is a diagram of an exemplary network device in which systems and methods consistent with the principles of the invention may be implemented. In this particular implementation, the network device takes the form of a router 100. Router 100 may receive one or more streams of data chunks from a physical link, process the stream(s) to determine destination information, and transmit the stream(s) on one or more links in accordance with the destination information.

Router 100 may include multiple packet forwarding engines (PFEs) 110 interconnected via a switch fabric 120. Switch fabric 120 may include one or more switching planes to facilitate communication between two or more of PFEs 110. In an implementation consistent with the principles of the invention, each of the switching planes includes a single or multi-stage switch of crossbar elements. Coordination among PFEs 110 may be accomplished by PFEs 110 themselves, by a system processor (not shown) that may be connected to PFEs 110, or a combination of these.

PFEs 110 may include forwarding tables to perform route lookup for incoming chunks of data (e.g., packets). PFEs 110 may receive data at ports on physical links connected to a network, such as a wide area network (WAN), a local area network (LAN), or another network device. Each physical link could be one of many types of transport media, such as optical fiber or Ethernet cable. The data on the physical link is formatted according to one of several protocols, such as the synchronous optical network (SONET) standard or Ethernet.

Figure 2:
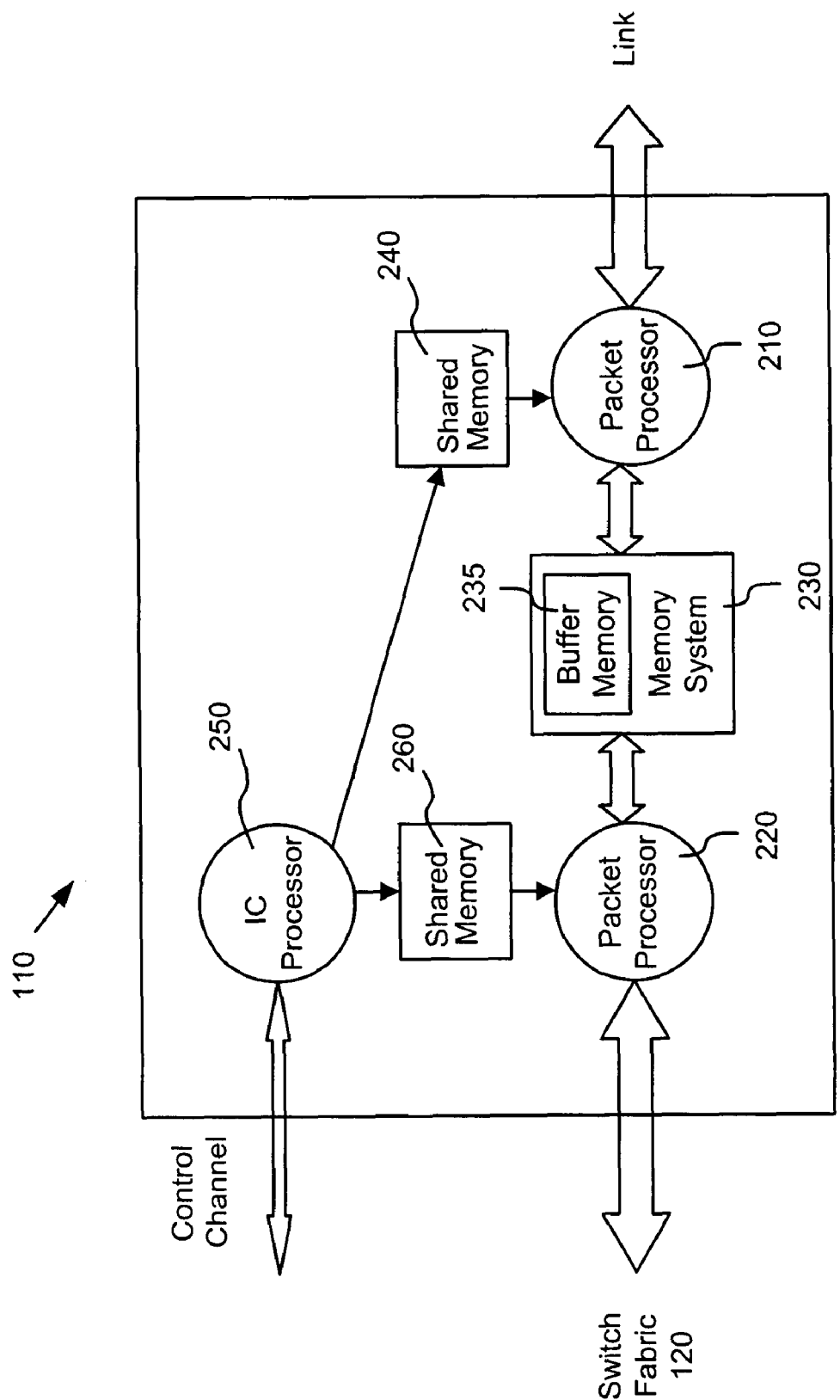
FIG. 2 is an exemplary diagram of a packet forwarding engine (PFE) of FIG. 1 according to an implementation consistent with the principles of the invention.

FIG. 2 is an exemplary diagram of a PFE 110 according to an implementation consistent with the principles of the invention. PFE 110 may include two packet processors 210 and 220, each connected to a memory system 230. PFE 110 also may include an interface controller (IC) processor 250 connected to shared memories 240 and 260, which are connected to packet processors 210 and 220, respectively. Packet processors 210 and 220 typically read routing-related information from their respective shared memories 240 and 260.

Packet processor 210 connects to one or more physical links. Packet processor 210 may process packets received from the incoming physical links and prepare packets for transmission on the outgoing physical links. For example, packet processor 210 may perform route lookup based on packet header information in conjunction with information from shared memory 240 to determine destination information for the packets. Packet processor 210 also may designate a "class" of data to which a particular chunk (e.g., packet) belongs. For example, chunks of data within a certain bandwidth may be designated as high priority, while chunks that exceed this bandwidth may be given a lower priority. For packets received from the links, packet processor 210 may store data in memory system 230. For packets to be transmitted on the links, packet processor 210 may read data from memory system 230.

Packet processor 210 may include one or more circuits, such as application-specific integrated circuits (ASICs), local memory, physical interface(s) and any other parts needed to interface between the physical links and memory system 230. In one implementation, packet processor 210 may include a device (not shown) that measures an amount of memory system 230 that is full (i.e., a "memory usage meter"). Packet processor 210 may also perform a RED function for PFE 110 that will be described in greater detail below.

Packet processor 220 connects to switch fabric 120. Packet processor 220 may include one or more circuits, such as ASICs, local memory, and any other parts needed to interface between the switch fabric 120 and memory system 230. Packet processor 220 may process packets received from switch fabric 120 and prepare packets for transmission to switch fabric 120. For packets received from switch fabric 120, packet processor 220 may store data in memory system 230. For example, such packets from switch fabric 120 may be stored in logical queues within memory system 230. For packets to be transmitted to switch fabric 120, packet processor 220 may read data from memory system 230. Although described as including different ASICs, in some implementations consistent with the principles of the invention, the functionality of packet processors 210 and 220 described herein may be performed by the same processor/ASIC or set of processors/ASICs. Thus, the arrangement shown in FIG. 2 conceptually illustrates the functionality of PFE 110 and does not necessarily reflect any particular, physical implementation of PFE 110.

Memory system 230 may include a buffer memory 235 for storing chunks of data from switch fabric 120 prior to transmitting them on physical links according to an implementation consistent with the principles of the invention. Buffer memory 235 may store the chunks of data in logical queues, possibly occupying non-contiguous locations. Packet processor 220 may store the chunks of data in such queues based on, for example, an interface (e.g., a packet stream or port within an external link) to which the packet information corresponds. Other information, such as a traffic class to which the packet belongs, may be used in determining the particular queue(s) in which to store the packet information.

Figure 3:
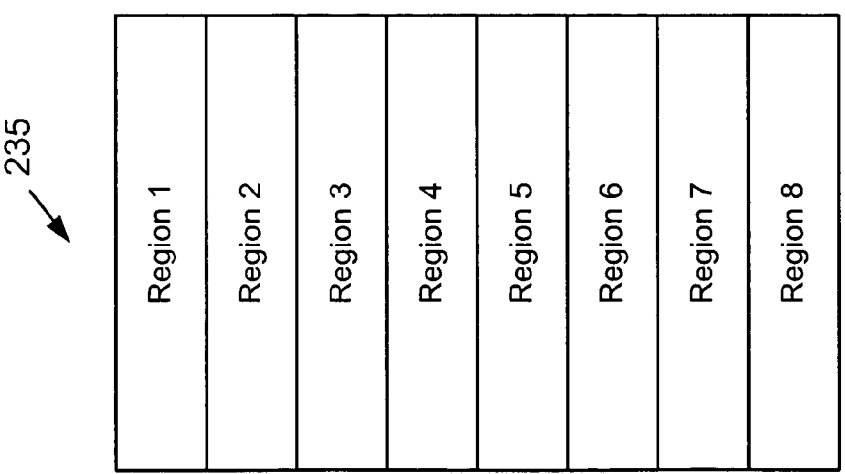
FIG. 3 is an exemplary fullness diagram of a portion of the memory of FIG. 2 according to an implementation consistent with the principles of the invention.

FIG. 3 is an exemplary fullness diagram for buffer memory 235 according to an implementation consistent with the principles of the invention. Buffer memory 235 may be implemented by a DRAM or SRAM device. As mentioned above, the "fullness" of buffer memory 235 may be determined by a memory usage meter (not shown) in packet processor 210. Such a memory usage meter may determine an overall level of utilization of buffer memory 235 relative to a total capacity of buffer memory 235. Such "fullness" of buffer memory may be expressed with varying degrees of precision depending on the needs of PFE 110. For example, the fullness of buffer memory 235 may be measured to within a few percent of its total capacity, and such measurement may be produced by hardware and/or software in packet processor 210 as either a percentage value or an unprocessed "raw" measurement value.

One possible scheme for determining the fullness of buffer memory 235 may be to map or "bin" a more precise measurement by packet processor 210 into one of a number of coarser fullness values. FIG. 3 conceptually illustrates an eight-level fullness scale for buffer memory 235. For example, if buffer memory 235 is between 0 and one-eighth full (as measured by packet processor 210), its utilization falls in Region 1 on the scale in FIG. 3. Similarly, if buffer memory 235 is between one-eighth and one-quarter full, its utilization falls in Region 2, and so on to Region 8, which indicates near-fullness of buffer memory 235. It should be noted that data in queues within buffer memory 235 need not be contiguous, nor beginning at a lowest/highest logical address within the memory, so Regions 1-8 in FIG. 3 do not necessarily correspond to the location(s) of usage within buffer memory 235. Rather, Regions 1-8 in FIG. 3 illustrate a coarse, eight-level fullness scale for buffer memory 235 that may be used in a dynamic oversubscription scheme that is described in greater detail below.

Returning to FIG. 2, IC processor 250 and shared memories 240/260 may be configured to assist the operation of packet processors 210/220. For example, packet processor 210 may implement the dynamic oversubscription scheme that is described in further detail below. IC processor 250 may receive parameters for such a scheme via a control channel. IC processor 250 may be configured to format and process such parameters, prior to storage in shared memory 240. Such formatting/processing may optimize the parameters for rapid retrieval from shared memory 240 and/or rapid use by packet processor 210.

Dynamic Oversubscription Scheme

Queues in buffer memory 235 may include a set of first-in-first-out (FIFO) logical buffers that temporarily store chunks of data that are to be transmitted from PFE 110 on one or more physical links. In one implementation consistent with the principles of the invention, the queues in buffer memory 235 may be associated with a particular traffic class-interface pair. For example, if PFE 110 is associated with 4,000 IP interfaces, each of which may include four traffic classes, then 16,000 queues may be created in buffer memory 235. A larger or smaller number of different queues may be created in buffer memory 235, depending on the number of destination interfaces and traffic classes. Further, different schemes of creating queues are possible, such as creating queues based only on the number of interfaces. In such a case, a particular queue may contain chunks of data belonging to different traffic classes. Moreover, queues may be created for protocols other than IP, such as the Point-to-point Protocol (PPP), or MPLS, or other suitable protocols. Queues may also be created based on interface/sub-interface types such as, for example, Ethernet VLANs, ATM VCs, ATM VPs, Frame relay DLCIs, etc.

In order to provide both fairness among queues and the efficient sharing of buffer memory 235 among the queues, packet processor 210 may implement an oversubscription scheme for the queues in buffer memory 235. "Oversubscription," in general, refers to offering more of a resource (in this case capacity in buffer memory 235) than may be provided. For example, packet processor 210 may oversubscribe queue space in buffer memory 235 on the valid, probabilistic assumption that not all queues will simultaneously use all of their assigned memory. By contrast, "strictly partitioning" a resource divides it so that demand may always be satisfied (e.g., assigning each queue a length of the total capacity of buffer memory 235 divided by the number of queues). The oversubscription scheme implemented by packet processor 210 may include a "static oversubscription" aspect and a "dynamic oversubscription" aspect.

In the static oversubscription aspect, packet processor 210 may assign amounts of memory in buffer memory 235 to respective queues (i.e., queue lengths) based on the number of queues, which is a relatively unchanging (i.e., static) characteristic of PFE 110. In other words, the number of traffic class-interface pairs (and hence the number of queues) tends to remain fairly stable over time. In static oversubscription, when the number of queues is small, buffer memory 235 may be strictly partitioned to ensure that memory is available for all queues. Also, when the number of queues increases (e.g., becomes large), buffer memory 235 may be increasingly oversubscribed to allow more memory sharing among queues. This static oversubscription scheme is based on the probabilistic assumption that when few queues exist, it is likely that they will be active at the same time. Conversely, when a large number of queues exist, it is likely that they all will not be active at the same time.

In the dynamic oversubscription aspect, packet processor 210 may vary queue lengths based on how much of buffer memory 235 is currently in use. Unlike the number of traffic class-interface pairs, the overall usage of buffer memory 235 (as measured by a memory usage meter in packet processor 210) tends to fluctuate over time. In a dynamic oversubscription scheme, when the overall usage of buffer memory 235 is low, queue lengths may be increased (i.e., buffer memory 235 may be relatively highly oversubscribed). When the overall usage of buffer memory 235 increases, however, queue lengths may be decreased (i.e., buffer memory 235 may be progressively less oversubscribed). This dynamic oversubscription scheme facilitates the sharing of buffer memory 235 when it has capacity, but also prevents one or more active queues from starving other queues as buffer memory 235 becomes full.

Figure 4:
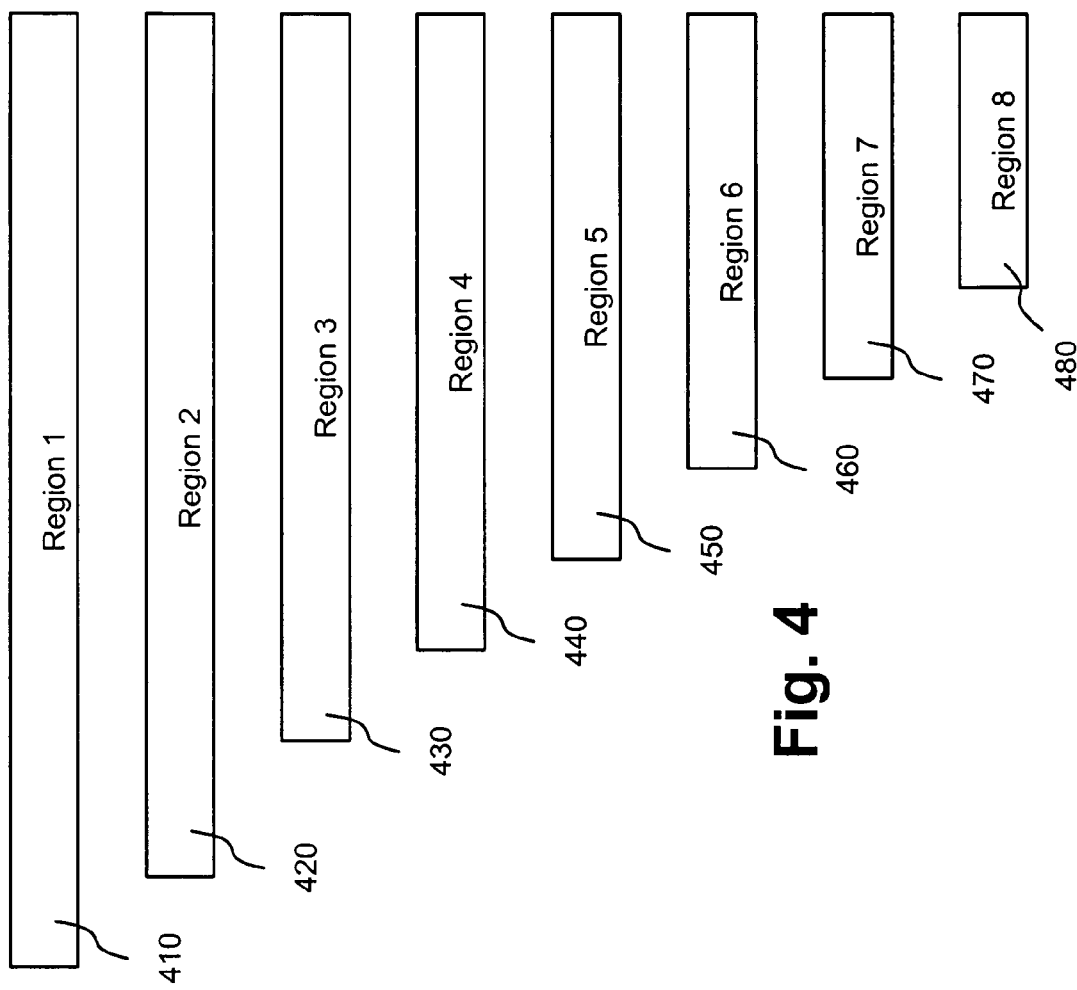
FIG. 4 is an exemplary diagram illustrating dynamic queue resizing consistent with the principles of the invention.

FIG. 4 is an exemplary diagram illustrating dynamic queue resizing relative to the fullness of buffer memory 235 consistent with the principles of the invention. Typical queue lengths/sizes 410-480 in FIG. 4 may vary depending on the fullness (region) of buffer memory 235, as illustrated, for example, in FIG. 3. When buffer memory 235 is less than one-eighth full (i.e., Region 1 fullness), queues may be accorded a relatively large length 410. As the fullness of memory 235 increases (e.g., to between three-eighths and one-half full (i.e., Region 4 fullness)), queue lengths 440 may be shortened. When buffer memory 235 is nearly full (e.g., Region 8 fullness in FIG. 3), queues may be accorded a relatively small length 480. Queue length 480 may correspond to a strict partitioning of buffer memory 235 among the available queues. Alternately, queue length 480 may be slightly oversubscribed relative to a strictly partitioned memory amount.

As illustrated in FIG. 4, queues within buffer memory 235 may be dynamically resized based on fullness measurements of buffer memory 235 by a memory usage meter in packet processor 210. Consistent with the principles of the invention, fullness measurements of buffer memory 235 (and possible dynamic resizing of queues based on the measurements) may be performed as often as practical in PFE 110.

Random Early Detection (RED) Scheme

Figure 5:
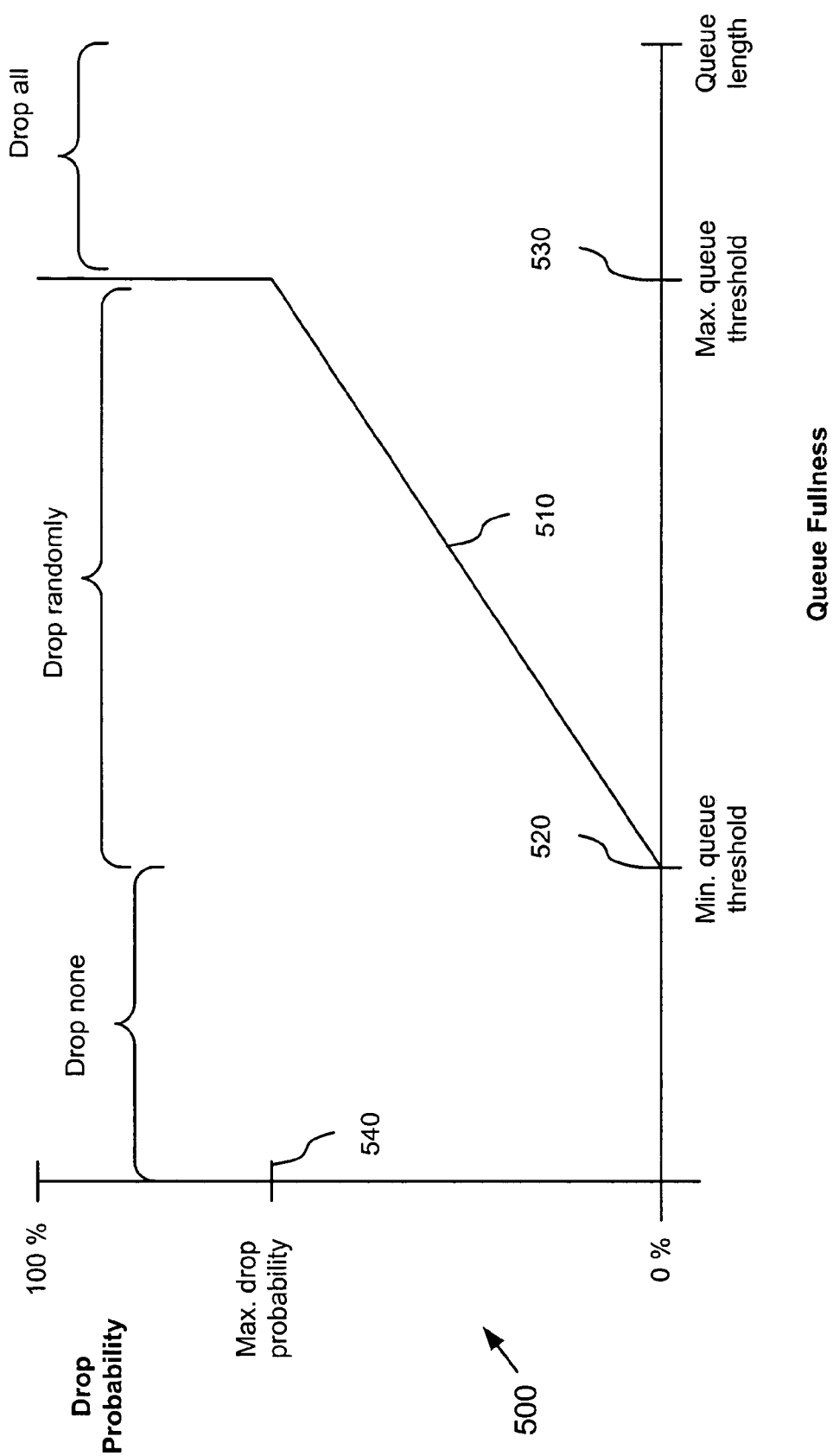
FIG. 5 is an exemplary RED drop profile.

FIG. 5 illustrates an exemplary RED drop plot 500. Plot 500 contrasts the probability that a chunk of data will be randomly dropped from a queue with some measure of the fullness of the queue (e.g., average queue length). Drop profile 510 specifies chunk dropping behavior due to RED for one or more queues. Drop profile 510 may be uniquely determined using three parameters: 1) a minimum queue threshold 520, 2) a maximum queue threshold 530, and 3) a maximum drop probability 540. Drop profile 510 may be expressed in shorthand notation as:

$$DP(Min\_Th, Max\_Th, Max\_Prob),$$

where Min_Th is a value for minimum queue threshold 520, Max_Th is a value for maximum queue threshold 530, and Max_Prob is a value for maximum drop probability 540.

Minimum queue threshold 520 may represent a measure of queue fullness (e.g., average queue length) below which no chunks of data are dropped from the queue in buffer memory 235. When minimum queue threshold 520 is exceeded for a queue, chunks of data may be randomly dropped or tail-dropped, depending on how much the fullness of the queue exceeds minimum queue threshold 520. When minimum queue threshold 520 is not exceeded for a queue, however, the queue fills and empties normally.

Maximum queue threshold 530 may represent a measure of queue fullness (e.g., average queue length) above which all new chunks of data are tail-dropped from the queue in question. In some implementations, maximum queue threshold 530 may be less than the total length of the queue. When maximum queue threshold 530 is exceeded for a queue, no new chunks of data are added to the queue (i.e., 100% are dropped from the tail) to allow the queue to drain as fast as possible. When queue fullness (e.g., average queue length) lies between minimum queue threshold 520 and maximum queue threshold 530, packet processor 210 may randomly drop some percentage of new chunks from the tail of the queue(s).

In drop profile 510 shown in FIG. 5, the percentage of chunks of data that are randomly dropped from a queue may vary roughly linearly from zero to maximum drop probability 540 as the queue fullness (e.g., average queue length) ranges from minimum queue threshold 520 to maximum queue threshold 530. Although maximum drop probability 540 is illustrated in FIG. 5 as being somewhat closer to 100% than 0%, it should be noted that maximum drop probability 540 may lie anywhere in this range and may only be, for example, 5% or 10%. Further, consistent with the principles of the invention, other ways than linearly may be used to vary drop probability between minimum queue threshold 520 and maximum queue threshold 530. For example, step functions, polynomial, logarithmic, and/or other increasing functions may be employed to vary drop probability between 0% and maximum drop probability 540. Moreover, consistent with the principles of the invention, drop probability may have some non-zero initial value at minimum queue threshold 520.

Although the lower axis in FIG. 5 is labeled "queue fullness," a weighted fullness average (i.e., average queue length) may be employed in some implementations consistent with the principles of the invention to reduce sensitivity to sudden increases in queue fullness. One example of such an average fullness may be seen in the following exponential weighted moving average:

$$averageFullness = averageFullness + 2^{-aveExp}(currentFullness - averageFullness),$$

where the value of aveExp may be chosen based on the speed of the link associated with the queue in question. As an example, for an OC3 link, aveExp may be set to be about 10.

Dynamic Red Scheme

In one implementation consistent with the principles of the invention, minimum queue threshold 520 and maximum queue threshold 530 may be expressed as, for example, percentages of total queue length. One example may be to use 25% of the queue length for minimum queue threshold 520 and 90% of the queue length maximum queue threshold 530. Such a scheme permits using the same drop profile 510, even when total queue lengths dynamically change, as in FIG. 4. By contrast, static values for minimum queue threshold 520 and maximum queue threshold 530 may not be appropriate when queue lengths change, as the queue length may become less than a static maximum queue threshold. Using percentages for queue thresholds 520/530 consistent with the principles of the invention facilitates using RED even when queues are dynamically resized. Consistent with the principles of the invention, other schemes than calculating percentage values may be used for providing adjustable and/or self-adjusting queue thresholds 520/530 for use with dynamic queue oversubscription, such as a lookup table in shared memory 240.

Figure 6:
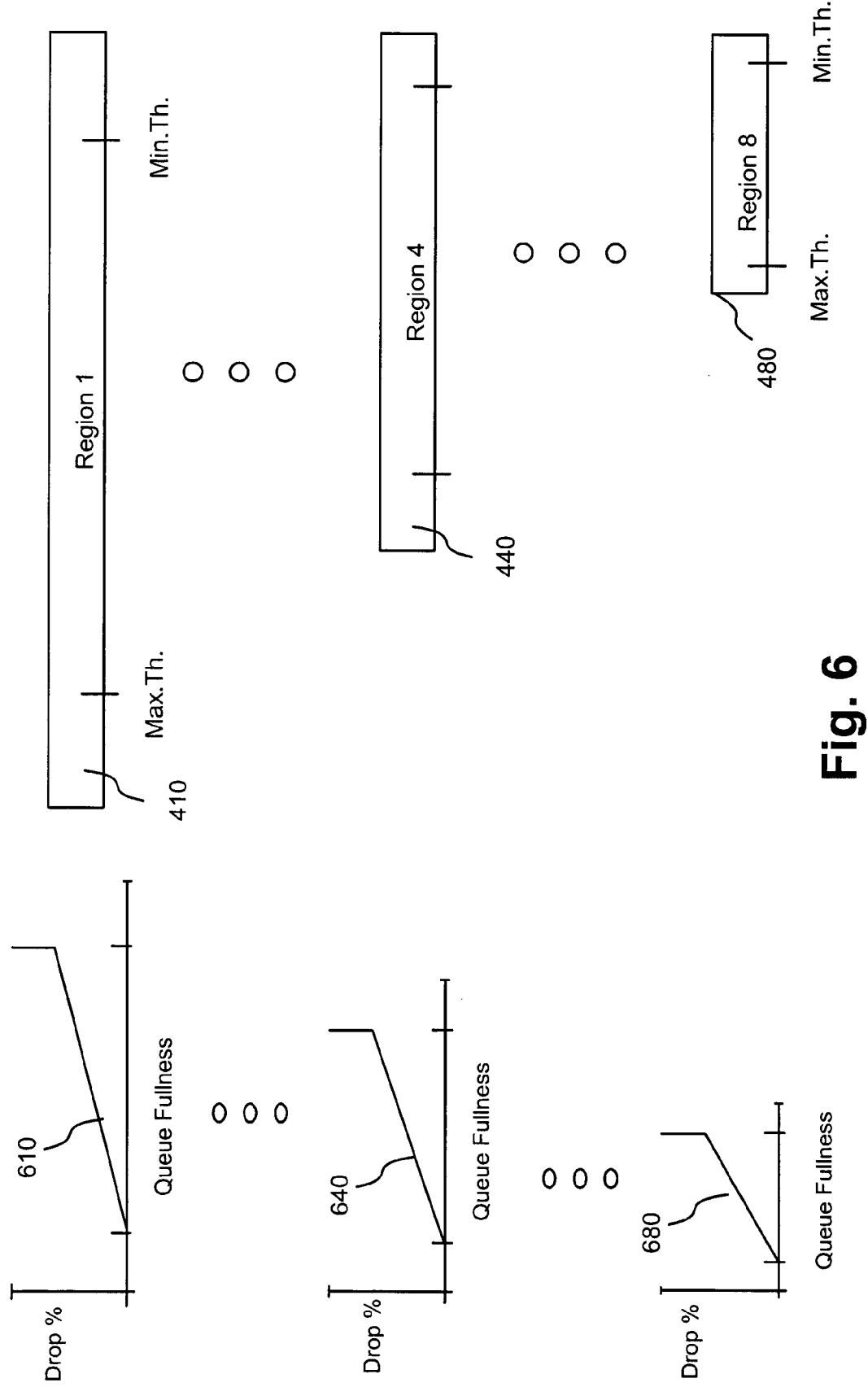
FIG. 6 is an exemplary diagram illustrating dynamic RED drop profiles associated with the queues of FIG. 4 according to an implementation consistent with the principles of the invention.

FIG. 6 is an exemplary diagram illustrating dynamically changing RED drop profiles 610-680 associated with dynamically oversubscribed queues 410-480 of FIG. 4 according to an implementation consistent with the principles of the invention. Of drop profiles 610-680 and queues 410-480, only drop profiles 610, 640, and 680 and queues 410, 440, and 480 are illustrated in FIG. 4 for ease of presentation. For all of profiles 610-680, the minimum and maximum thresholds may be set at 20% and 80% of the total queue length, respectively. Using these exemplary values, when the usage of buffer memory 235 is in Region 1 (e.g., less than one-eighth full), queue 410 may be substantially oversubscribed and may have a length of 100 KB. In this example, the minimum threshold for queue 410 and drop profile 610 may be 20 KB, and the maximum threshold for queue 410 and drop profile 610 may be 80 KB. Drop profile 610 may employ the same maximum drop percentage (e.g., 3% or 5% or 10%, etc.) as drop profiles 640 and 670.

Similarly, when the usage of buffer memory 235 is in Region 4 (e.g., between three-eighths and half full), queue 440 may be somewhat less oversubscribed and may have a total length of 60 KB. In this example, the minimum threshold for queue 440 and drop profile 640 may be 12 KB (i.e., 20% of 60 KB), and the maximum threshold for queue 440 and drop profile 640 may be 48 KB (i.e., 80% of 60 KB). Even if the maximum drop percentage of profile 640 is the same as that of profile 610, the slope of profile 640 is greater, because it reaches the maximum drop percentage over an average queue fullness range of 36 KB (i.e., 48 KB −12 KB), as opposed to 60 KB for drop profile 610.

As a final example, when the usage of buffer memory 235 is in Region 8 (e.g., greater than seven-eighths full), queue 480 may not be oversubscribed and may have a total length of 20 KB. In this example, the minimum threshold for queue 480 and drop profile 680 may be 4 KB (i.e., 20% of 20 KB), and the maximum threshold for queue 480 and drop profile 680 may be 16 KB (i.e., 80% of 20 KB). Profile 680 may reach the maximum drop percentage over an average queue fullness range of 12 KB (i.e., 16 KB −4 KB), as opposed to 36 KB for drop profile 640 and 60 KB for drop profile 610. Although in this particular numerical example, the maximum threshold for queue 480 and drop profile 680 (i.e., 16 KB) is less than the minimum threshold for queue 410 and drop profile 610 (i.e., 20 KB), this need not always be true. For example, in FIG. 6 (notwithstanding the exemplary numbers provided above), the maximum threshold for drop profile 680 does not visually appear to be less than (i.e., to the left of) the minimum threshold for drop profile 610.

It should be noted that the above numerical examples, and profiles 610-680 in FIG. 6, are purely exemplary. In accordance with the principles of the invention described herein, other schemes and mechanisms other than percentages may be used to vary the minimum and maximum thresholds of RED drop profiles 610-680 as the lengths of queues 410-480 dynamically change. Moreover, the particular sizes given in the examples are for purposes of explanation only. The principles described herein may be applied to any memory size.

Weighted Dynamic Red Scheme

Figure 7:
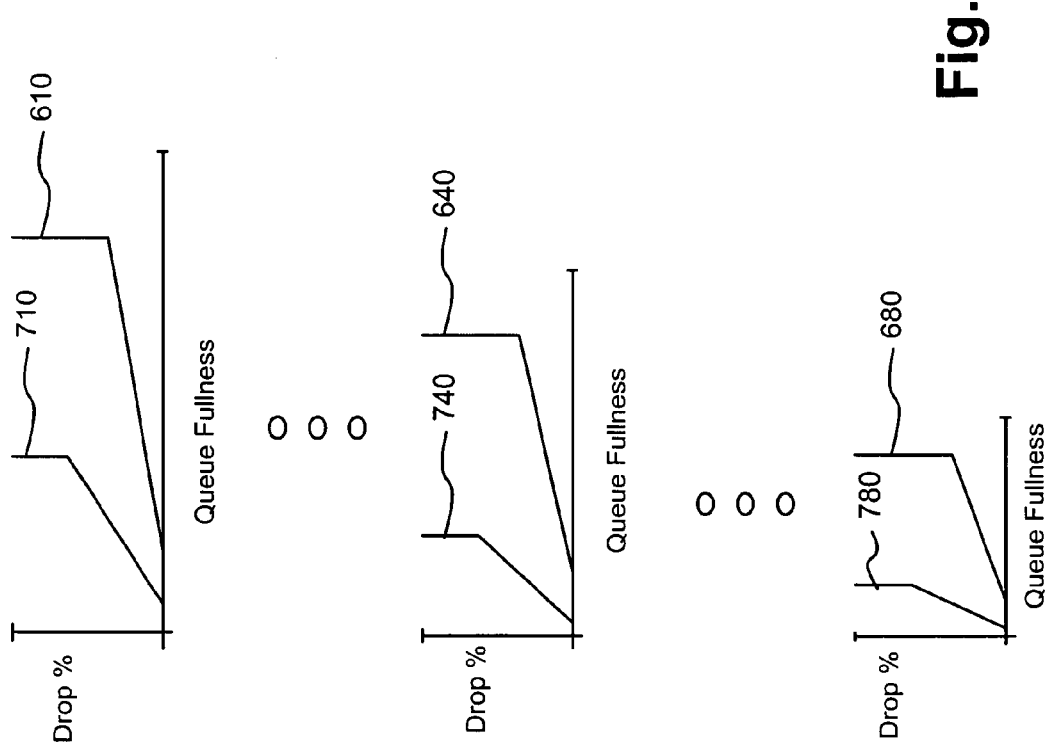
FIG. 7 is an exemplary diagram illustrating dynamic RED drop profiles that vary by type of data according to an implementation consistent with the principles of the invention.

FIG. 7 is an exemplary diagram illustrating dynamic RED drop profiles 610-680 and 710-780 that vary by type of data according to an implementation consistent with the principles of the invention. In one implementation, drop profiles 610-680 may be associated with a group of queues containing a type/class of data that has a relatively high priority, and drop profiles 710-780 may be associated with a group of queues containing a type/class of data that has a relatively low priority. Alternately or additionally, RED drop profiles 610-680 and 710-780 may be associated with the same queue (or group of queues) that contains data of both classes. Consistent with the principles of the invention, greater than two data types/classes are possible for chunks of data within PFE 110 and buffer memory 235. Such data classes may include, but are not limited to, video data, multicast data, internet data, and/or a default classification (e.g., best effort).

Exemplary values for profiles 610-680 for high priority chunks of data may include DPI(20, 80, 5), indicating that the minimum queue threshold is 20% of the total queue length, the maximum queue threshold is 80% of the total queue length, and the maximum drop probability is 5%. By contrast, exemplary values for profiles 710-780 for lower priority chunks may include $DP_2$(10, 40, 10). Packet processor 210 may begin to randomly drop chunks of data associated with profiles 710-780 earlier (i.e., at 10% of the total queue length) than chunks of data associated with drop profiles 610-680. Such lower priority chunks associated with profiles 710-780 may also be randomly dropped up to a lower maximum threshold (i.e., 40% of the total queue length) and may have a higher maximum drop probability (i.e., 10%) than chunks of data associated with profiles 610-680. The above numerical examples for profiles 610-680 and 710-780 in FIG. 7 are purely exemplary, and should not be construed to limit the principles of the invention described herein.

Exemplary Processing

Figure 8:
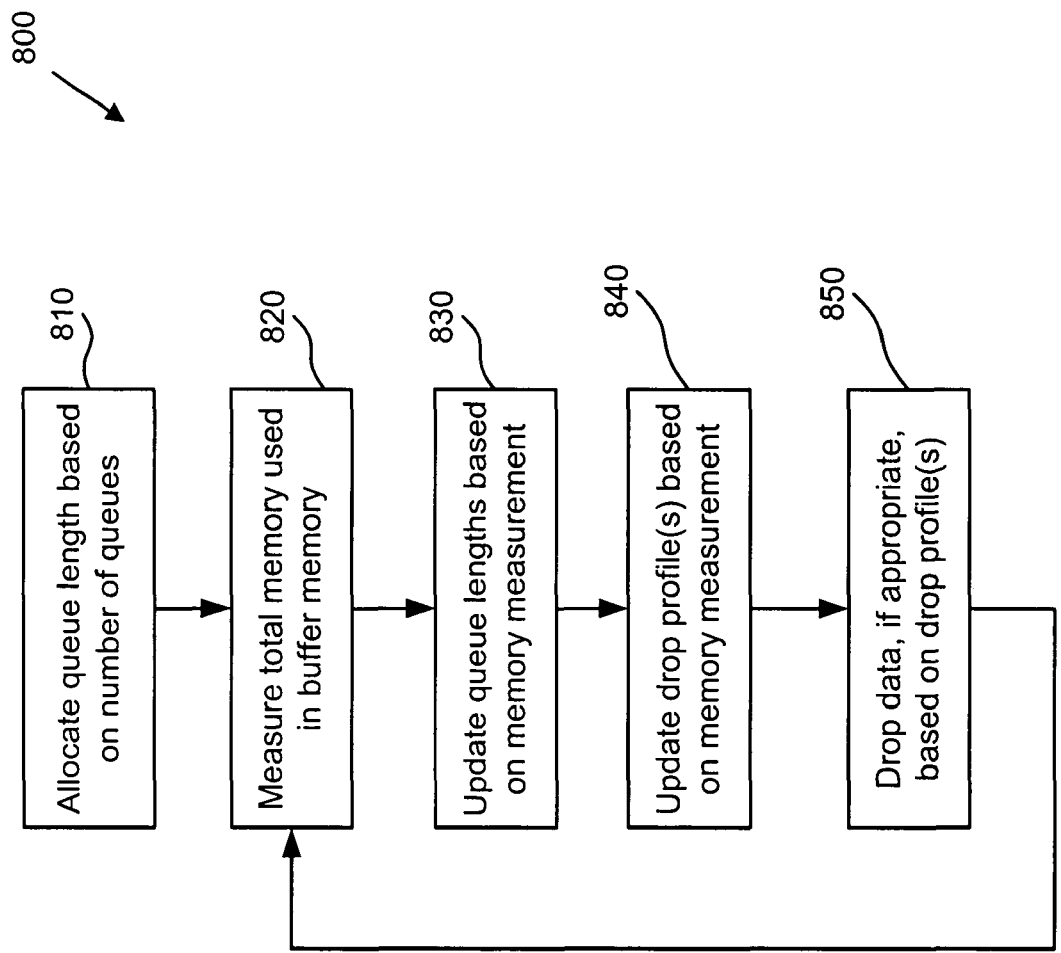
FIG. 8 is an exemplary flow chart illustrating processing consistent with the principles of the invention.

FIG. 8 is an exemplary flow chart 800 illustrating processing consistent with the principles of the invention. Processing may begin with packet processor 210 allocating queue lengths to queues in buffer memory 235 based on a total number of queues [act 810]. Such allocation may statically oversubscribe the queues in accordance with the static oversubscription scheme discussed previously. Processing may continue with packet processor 210 measuring a total amount of memory filled/used in buffer memory 235 [act 820]. This measurement may be performed, for example, using a memory usage meter implemented in hardware/software within packet processor 210.

Packet processor 210 may use this memory measurement to update the lengths of the queues in buffer memory 235 [act 830]. Such updating may dynamically oversubscribe the queues in accordance with the dynamic oversubscription scheme discussed previously with respect to FIG. 4. Packet processor 210 may work in conjunction with shared memory 240 to perform this updating, perhaps reading data related to queue oversubscription amounts from shared memory 240. It should be noted that updating queue lengths does not necessarily mean changing such lengths. The measurement in act 820 may indicate that the usage of buffer memory 235 is in the same fullness region as the preceding measurement, in which case the queue lengths may remain the same.

Packet processor 210 also may use this memory measurement to update the drop profiles associated with the queues in buffer memory 235 [act 840]. Such updating may involve recomputing minimum and maximum queue limits 520/530 in accordance with the dynamic RED scheme discussed previously with respect to FIG. 5. Packet processor 210 may read appropriate data related to dynamic RED from shared memory 240. It should be noted that queue threshold percentages may not be changed when the total usage of buffer memory 235 changes usage regions. Rather, updated minimum and maximum queue limits 520/530 may be read from shared memory 240 and/or recomputed from the percentages in the appropriate drop profile. In act 840, packet processor 210 may also update drop profiles for different types/classes of data in buffer memory 235, as explained with respect to FIG. 7.

Processing may continue with packet processor 210 dropping data, if appropriate, based on the updated drop profiles [act 850]. Queue fullnesses (e.g., average fullness) also may be updated in conjunction with act 850. If the minimum queue threshold (e.g., limit 520) is not exceeded, no chunks of data may be randomly dropped in accordance with the updated drop profiles (see FIG. 5). If the queue fullness lies between the minimum and maximum queue thresholds (e.g., limits 520 and 530), packet processor 210 may randomly drop chunks from the queues with a probability up to the maximum drop probability (e.g., limit 540) specified by the particular drop profile in question. If the queue fullness exceeds the maximum queue threshold for a particular queue, packet processor 210 may tail-drop 100% of new chunks from the queue until the queue fullness once again falls below the maximum queue threshold.

Act 850 may continue until packet processor 210 again measures the total memory used in buffer memory 235 [act 820], at which point acts 830-850 may be repeated based on the updated memory measurement.

CONCLUSION

Systems and methods consistent with the principles of the invention provide congestion control techniques to efficiently process and buffer data in a network device. Random early data dropping may be retained even when queue lengths change due to, for example, dynamic oversubscription.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although eight memory usage regions have been described with respect to FIGS. 3, 4, 6, and 7, smaller or larger numbers of memory regions are possible. For example, buffer memory 235 may be divided into four or 16 discrete regions. Also, while some memory elements have been described as RAMs, other types of memory devices may be used in other implementations consistent with the principles of the invention.

Certain portions of the invention have been described as "logic" or a "processor" that performs one or more functions. This logic/processor may include hardware, such as an application specific integrated circuit or a field programmable gate array, software, or a combination of hardware and software.

Also, while a series of acts have been described with regard to FIG. 8, the order of the acts can be varied in other implementations consistent with the present invention, and non-dependent acts can be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A system for providing congestion control, comprising:
a buffer memory configured to temporarily store data in a plurality of queues; and
a processor configured to:
measure a total amount of memory occupied by the plurality of queues in the buffer memory,
modify lengths of the plurality of queues based on the total amount of memory occupied, where modifying the lengths of the plurality of queues includes decreasing the lengths of the plurality of queues when the total amount of memory occupied increases; and
modify drop profiles associated with the plurality of queues based on the total amount of memory occupied.

2. The system of claim 1, wherein the processor is further configured to:
initially allocate lengths to the plurality of queues based on a total number of the plurality of queues.

3. The system of claim 1, wherein when measuring the total amount of memory occupied, the processor is further configured to:
designate one of a plurality of discrete memory usage levels into which the total amount of memory falls.

4. The system of claim 1, wherein when modifying the drop profiles, the processor is configured to:
change minimum queue thresholds and maximum queue thresholds associated with the drop profiles based on the lengths of the plurality of queues.

5. The system of claim 1, wherein when modifying the drop profiles, the processor is further configured to:
modify different drop profiles that are associated with different classes of data within the plurality of queues.

6. The system of claim 1, wherein the processor is further configured to:
selectively drop data from the plurality of queues based on the drop profiles.

7. A system for providing congestion control, comprising:
a buffer memory configured to temporarily store data in a plurality of queues; and
a processor configured to:
measure a total amount of memory occupied by the plurality of queues in the buffer memory,
modify lengths of the plurality of queues based on the total amount of memory occupied, and
modify drop profiles associated with the plurality of queues based on the total amount of memory occupied, where modifying the drop profiles includes changing minimum queue thresholds and maximum queue thresholds associated with the drop profiles based on the lengths of the plurality of queues and where the minimum queue thresholds and the maximum queue thresholds are respectively percentages of the lengths of the plurality of queues.

8. A system for providing congestion control, comprising:
a buffer memory configured to temporarily store data in a plurality of queues; and
a processor configured to:
measure a total amount of memory occupied by the plurality of queues in the buffer memory,
modify lengths of the plurality of queues based on the total amount of memory occupied,
modify drop profiles associated with the plurality of queues based on the total amount of memory occupied, and
selectively drop data from the plurality of queues based on the drop profiles, where when selectively dropping data from the plurality of queues, the processor is configured to:
randomly drop data from at least one queue when a queue fullness is between a minimum queue threshold and a maximum queue threshold associated with a drop profile of the at least one queue, and
not drop data from the at least one queue when the queue fullness is less than the minimum queue threshold associated with the drop profile of the at least one queue.

9. A device, comprising:
a buffer memory configured to temporarily store data in a plurality of queues; and
a processor configured to:
measure a fullness of the buffer memory,
assign sizes to the plurality of queues based on the fullness of the buffer memory and based on a memory usage region into which the fullness of the buffer memory falls, and
adjust thresholds of drop profiles associated with the plurality of queues based on the sizes assigned to the plurality of queues.

10. The device of claim 9, wherein the processor is further configured to:
initially set the sizes for the plurality of queues based on a number of the queues.

11. The device of claim 9, wherein the buffer memory is associated with eight or more different memory usage regions.

12. The device of claim 9, further comprising:
a shared memory connected to the processor and configured to store information for use in adjusting thresholds of the drop profiles associated with the plurality of queues,
wherein when adjusting thresholds of the drop profiles, the processor is configured to:
read the information from the shared memory for use in adjusting the thresholds.

13. The device of claim 9, wherein when adjusting the thresholds of the drop profiles, the processor is further configured to:

modify thresholds that are associated with different types of data within the plurality of queues.

14. The device of claim 9, wherein the processor is further configured to:
selectively drop data from the plurality of queues based on the thresholds of the drop profiles that were adjusted.

15. A device, comprising:
a buffer memory configured to temporarily store data in a plurality of queues; and
a processor configured to:
measure a fullness of the buffer memory,
assign sizes to the plurality of queues based on the fullness of the buffer memory, and
adjust thresholds of drop profiles associated with the plurality of queues based on the sizes assigned to the plurality of queues, where when adjusting thresholds of the drop profiles, the processor is configured to:
change minimum queue thresholds and maximum queue thresholds of the drop profiles by determining respective percentages of the sizes of the plurality of queues.

16. A method for providing congestion control for data stored in queues, comprising:
periodically measuring a fullness of a memory that contains the queues;
decreasing sizes of the queues when the fullness of the memory increases;
increasing sizes of the queues when the fullness of the memory decreases; and
adjusting queue fullness thresholds based on the sizes of the queues, the queue fullness thresholds for a particular queue defining a queue fullness region inside which the data in the particular queue is randomly dropped.

17. The method of claim 16, wherein the adjusting includes:
computing the queue fullness thresholds using percentages of the sizes of the queues.

18. The method of claim 16, wherein the adjusting includes:
looking up the queue fullness thresholds in a table using the sizes of the queues.

19. The method of claim 16, further comprising:
randomly dropping data from the particular queue when a fullness of the particular queue falls within the queue fullness region defined by the queue fullness thresholds.

20. The method of claim 19, wherein the fullness of the particular queue is an exponential, weighted moving-average fullness.

21. A method for providing congestion control for data stored in queues, comprising:
dynamically changing oversubscription of the queues based on total usage of a memory that contains the queues to set new lengths for the queues; and
performing random early detection on the queues based on the new lengths, where the performing includes:
determining minimum and maximum queue fullness thresholds from percentages of the new lengths, and
randomly dropping data from one of the queues when a fullness of the one queue falls between the minimum and maximum queue fullness thresholds.

22. A system for providing congestion control for data stored in queues, comprising:
means for measuring memory usage;
means for updating a length of a queue based on the measured memory usage;
means for updating minimum and maximum thresholds of a drop profile associated with the queue based on the updated length of the queue, where the minimum and maximum thresholds are respectively percentages of the length of the queue; and
means for selectively dropping data from the queue based on the updated minimum and maximum thresholds of the drop profile associated with the queue.

* * * * *